US009260027B2

(12) United States Patent
Kim

(10) Patent No.: US 9,260,027 B2
(45) Date of Patent: Feb. 16, 2016

(54) DEVICE FOR ATTACHING AND REMOVING CONNECTOR FOR ELECTRIC VEHICLE OF BATTERY EXCHANGING TYPE

(71) Applicants: Hyundai Motor Company, Seoul (KR); Kia Motors Corporation, Seoul (KR)

(72) Inventor: Duk Joo Kim, Jeollabuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 88 days.

(21) Appl. No.: 14/143,323

(22) Filed: Dec. 30, 2013

(65) Prior Publication Data

US 2014/0342591 A1    Nov. 20, 2014

(30) Foreign Application Priority Data

May 20, 2013    (KR) .................... 10-2013-0056412

(51) Int. Cl.
*H01R 13/62* (2006.01)
*B60L 11/18* (2006.01)

(52) U.S. Cl.
CPC ......... *B60L 11/1822* (2013.01); *B60L 11/1818* (2013.01); *B60L 11/1879* (2013.01)

(58) Field of Classification Search
CPC ............ B60L 11/1816; B60L 11/1818; B60L 11/1822; B60L 11/1827; B60L 11/1851; B60L 11/1853; B60L 11/1877; B60L 11/1881; H01R 13/627; H01R 13/62; H01R 13/629; H01R 13/62905
USPC ......... 439/159, 259, 310, 500, 188, 911, 131, 439/197, 248, 247; 200/51.08–51.12; 320/109, 110, 129
See application file for complete search history.

(56) References Cited

U.S. PATENT DOCUMENTS

| 4,684,580 | A | * | 8/1987 | Cramer | H01M 10/122 429/149 |
| 4,758,696 | A | * | 7/1988 | Grazer | 200/51.09 |
| 4,778,395 | A | * | 10/1988 | Narita | H01R 13/629 439/159 |
| 5,250,770 | A | * | 10/1993 | Cummings | 200/295 |
| 5,360,307 | A | * | 11/1994 | Schemm et al. | 414/343 |
| 5,373,910 | A | * | 12/1994 | Nixon | B60K 1/04 104/34 |
| 5,810,620 | A | * | 9/1998 | Kobayashi | A61B 1/00114 392/379 |
| 7,402,062 | B2 | * | 7/2008 | Perry | 439/248 |
| 7,626,357 | B2 | * | 12/2009 | Hoffman | H02J 7/0045 320/110 |
| 7,682,169 | B2 | * | 3/2010 | Park | 439/159 |
| 8,333,601 | B2 | * | 12/2012 | Nakashima | 439/160 |
| 2008/0248666 | A1 | * | 10/2008 | Kinoshita | H01R 43/26 439/159 |

* cited by examiner

*Primary Examiner* — Amy Cohen Johnson
*Assistant Examiner* — Milagros Jeancharles
(74) *Attorney, Agent, or Firm* — Mintz Levin Cohn Ferris Glovsky and Popeo, P.C.; Peter F. Corless

(57) ABSTRACT

A device is provided that attaches and dettaches a connector for an electric vehicle of a battery replacement type. The device automatically connects and separates a connector at a battery and a connector at a vehicle when replacing a battery in an electric vehicle. The device may include a connector housing that is disposed on a battery mounting module for mounting and separating the battery and a connecting member that is connected to a cable at the vehicle, movably disposed within the connector housing, and selectively connected with the connector at the battery. A movable member is movably disposed within the connector housing in correspondence to the connecting member by a guide pin of the connector at the battery and a power transmitting member is connected to the connecting member and the movable member and moves the connecting member opposite to the movement direction of the movable member.

17 Claims, 5 Drawing Sheets

DEVICE FOR ATTACHING AND REMOVING CONNECTOR FOR ELECTRIC VEHICLE OF BATTERY EXCHANGING TYPE

CROSS-REFERENCE TO RELATED APPLICATION

This application claims priority to and the benefit of Korean Patent Application No. 10-2013-0056412 filed in the Korean Intellectual Property Office on May 20, 2013, the entire contents of which are incorporated herein by reference.

BACKGROUND (a) Field of the Invention

The present invention relates to a battery replacement type electric bus. More particularly, the present invention relates to a device for attaching and detaching a connector for an electric vehicle of a battery replacement type that automatically attaches and detaches a high-voltage connector during replacement of a battery.

(b) Description of the Related Art

In general, electric vehicles can travel, using an electric motor driven by electric energy charged in a high-voltage battery. Electric vehicles can be classified into a battery powered electric vehicle, a hybrid electric vehicle using both an electric motor and an engine, and a fuel cell electric vehicle.

It is necessary to construct infrastructures for charging by which a battery can be easily charged at anytime and anywhere for revitalization and expansion of use of the electric vehicles and various studies of the electric vehicles have been conducted. However, since plug-in type electric vehicles charges a battery with power, unlike the vehicles using fossil fuel (e.g., gasoline, diesel etc.) or natural gas, consumers are considerably inconvenienced due to the time required to charge the battery and the companies running the charging facilities have no economical efficiency due to the long waiting time.

Therefore, recently, a charging technology that charges a battery in advance without directly supplying power to the battery in electric vehicles, and then replaces the battery with the fully charged battery has been proposed. According to the battery replacement type, since the battery to be charged is replaced with a battery that is fully charged in advance, that battery may be conveniently used without requiring a specific time for charging. For example, an electric bus of a battery replacement type is equipped with a battery mounting module on the top for attaching and detaching a battery. When a battery is replaced by the battery mounting module on the electric bus, a high-voltage connector at the battery and a high-voltage connector at the bus are electrically connected.

However, when the battery is replaced by the battery mounting module on the top of the electric bus of a battery replacement type, the high-voltage connector at the battery and the high-voltage connector are manually connected to the vehicle. Therefore, since the high-voltage connector at the battery and the high-voltage battery on the vehicle are connected manually when the battery is replaced, in the related art, the time required to replace the battery may increase, the cost for replacing the battery increases, and the safety risk may increase.

The above information disclosed in this Bacground section is only for enhancement of understanding of the background of the invention and therefore it may contain information that does not form the prior art that is already known in this country to a person of ordinary skill in the art.

SUMMARY

The present invention provides a device for attaching and detaching a connector for an electric vehicle of a battery replacement type that automatically attaches and detaches a high-voltage connector at a battery and a high-voltage battery at a vehicle when replacing a battery in an electric bus.

An exemplary embodiment of the present invention provides a device for attaching and detaching a connector for an electric vehicle of a battery replace type, which automatically connects and separates a connector at a battery and a connector at a vehicle when replacing a battery in an electric vehicle and which may include a connector housing disposed on a battery mounting module to mount and separate the battery of an electric vehicle; a connecting member connected to a cable at the vehicle, movably disposed within the connector housing, and selectively connected with the connector at the battery; a movable member movably disposed within the connector housing that corresponds to the connecting member by a guide pin of the connector at the battery; and a power transmitting member connected to the connecting member and the movable member and that moves the connecting member opposite to the movement direction of the movable member.

In the device that attaches and detaches a connector for an electric vehicle of a battery replace type according to an exemplary embodiment of the present invention, a first movement path through which the connecting member moves and a second movement path through which the movable member moves may be formed in the connector housing. In addition, the guide pin may be inserted into the second movement path. An elastic member may be connected with the movable member and the connector housing to apply an elastic force to the movable member. In particular, the elastic member may include a return spring that connects the movable member and the connector housing together in the movement path of the movable member.

The device may further include a plurality of guide members disposed in the movement path of the connecting member in the connector housing and guides the connecting member. The guide members may be seated in mounting grooves on the inner side of the movement path of the connecting member and may be partially or fully seated in the mounting grooves by a shock-absorbing spring. In addition, the power transmitting member may include a pinion gear rotatably disposed in the connector housing.

Furthermore, a first rack gear that engages with the pinion gear may be formed on the connecting member and a second rack gear that engages with the pinion gear may be formed on the movable member. In addition, as a battery is mounted on the battery mounting module, the movable member may be moved to one side by the guide pin and the connecting member may be moved to the other side by the power transmitting member and electrically connected with the connector at the battery. As the battery is drawn out from the battery mounding module, the movable member may be moved to the other side by the elastic force of a spring, and the connecting member may be moved to one side by the power transmitting member and separated from the connector at the battery.

Another exemplary embodiment of the present invention provides a device that attaches and detaches a connector for an electric vehicle of a battery replacement type to automatically connect and separate a connector at a battery and a connector at a vehicle, when a battery is mounted on a battery mounting module of the electric vehicle or is separated from the battery mounting module. The device may include a connector housing disposed on the battery mounting module; a connecting member connected to a cable at the vehicle, movably disposed in the connector housing, and selectively connected with the connector at the battery; a movable member movably disposed within the connector housing in correspondence to the connecting member by a guide pin of the connector at the battery; a pinion gear rotatably disposed within the connector housing, between the connector member and the movable member, and that engages with rack gears on the connecting member and the movable member; an elastic member connected with the movable member and the connector housing and that applies an elastic force to the movable member; and a plurality of guide members disposed in the movement path of the connecting member within the connector housing and guiding the connecting member.

In the device that attaches and detaches a connector for an electric vehicle of a battery replace type according to an exemplary embodiment of the present invention, the connector housing may be connected to a battery movement path of the battery mounting module. A guide aperture that is a movement path through which the connecting member is drawn in and out may be formed within the connector housing. In addition, a guide rail that the connecting member slidably engages with may be disposed within the connector housing and a stopper may be formed at both ends of the guide rail. An insertion bore that is connected with the movement path of the movable member and into which the guide pin may be inserted may be formed within the connector housing.

According to the exemplary embodiment of the present invention, it may be possible to automatically connect and separate a connector at a battery and a high-voltage cable at a vehicle, when replacing a battery in a battery mounting module. Therefore, in an exemplary embodiment of the present invention, it may be convenient to replace the battery and to reduce the time required for replacing a battery as well as decrease the safety risk of manually replacing the battery.

BRIEF DESCRIPTION OF THE DRAWINGS

The drawings are provided for reference in describing exemplary embodiments of the present invention and the spirit of the present invention should not be construed only by the accompanying drawings.

DETAILED DESCRIPTION

Figure 1:
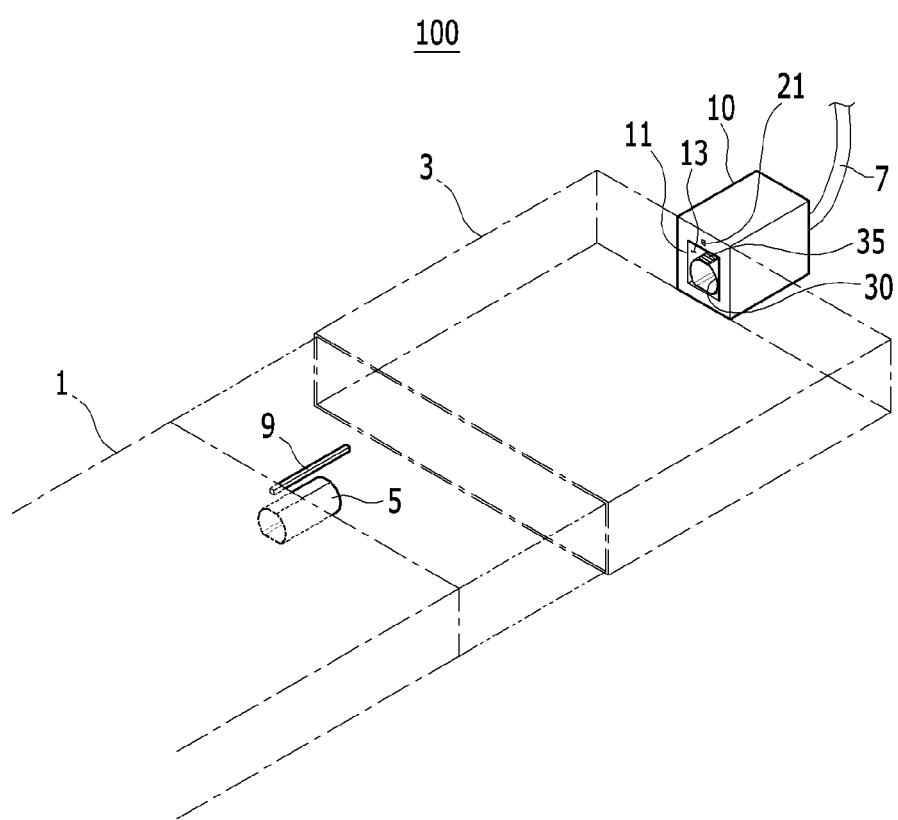
FIG. 1 is an exemplary view showing a device that attaches and dettaches a connector for an electric vehicle of a battery replacement type according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The unrelated parts to the description of the exemplary embodiments are not shown to make the description clear and like reference numerals designate like element throughout the specification.

Further, the sizes and thicknesses of the configurations shown in the drawings are provided selectively for the convenience of description, so that the present invention is not limited to those shown in the drawings and the thicknesses are exaggerated to make some parts and regions clear. Discriminating the names of components with the first, the second, etc. in the following description is for discriminating them for the same relationship of the components and the components are not limited to the order in the following description.

Further, the terms, ". . . unit", ". . . mechanism", ". . . portion", ". . . member" etc. used herein mean the unit of inclusive components performing at least one or more functions or operations. Although exemplary embodiment is described as using a plurality of units to perform the exemplary process, it is understood that the exemplary processes may also be performed by one or plurality of modules.

FIG. 1 is an exemplary view showing a device that attaches and dettaches a connector for an electric vehicle of a battery replacement type according to an exemplary embodiment of the present invention. Referring to FIG. 1, a device 100 that attaches and dettaches a connector may operate an electric motor, using an electric energy charged in a high-voltage battery 1 and used for an electric vehicle that may be driven by a driving force from the electric motor. For example, the device 100 may be available for an electric bus of a battery replacement type, which is a type of electric vehicles, with a vehicle being able to be mounted or separated by drawing the battery in/out.

A battery mounting module 3 for mounting or separating the battery 1 may be disposed on the roof of the electric bus. In other words, the battery mounting module 3 may be structured to allow a battery to be replaced by pushing in or pulling out the battery 1 from the battery mounting module 3. In particular, the battery 1 may be mounted on and separated from the battery module 3 by a battery replacement jig (not shown). The battery 1 may be drawn into (e.g., pulled into) the battery mounting module 3 and the electrically connected with a high-voltage cable 7 at the vehicle through a connecter at the battery, and may be drawn out from the battery mounting module 3 and then electrically separated from the high-voltage cable 7 at the vehicle. Further, the device 100 may automatically connect and separate the connector 5 at the battery and the high-voltage cable 7 at the vehicle when replacing the battery 1 in the battery mounting module 3.

An exemplary embodiment for replacing the battery 1 using the battery mounting module 3 on the top of an electric bus is described hereafter. Exemplary embodiments of the present invention, however, are not necessarily limited thereto and may be used for common electric vehicles of a battery replacement type.

Figure 2:
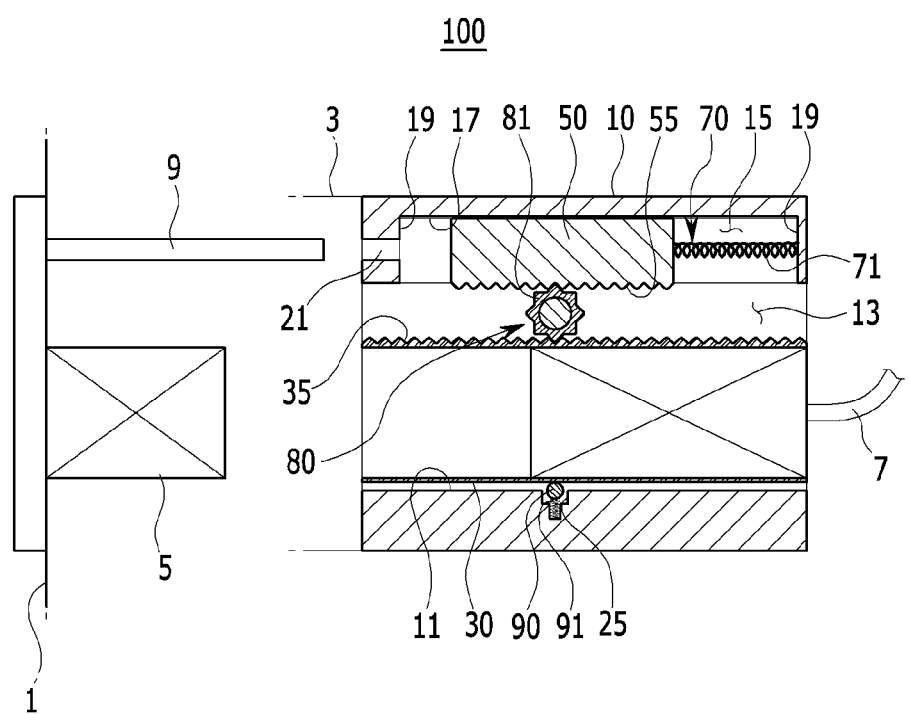
FIG. 2 is an exemplary front cross-sectional view showing the configuration of the device that attaches and dettaches a connector for an electric vehicle of a battery replacement type according to an exemplary embodiment of the present invention.
Figure 3:
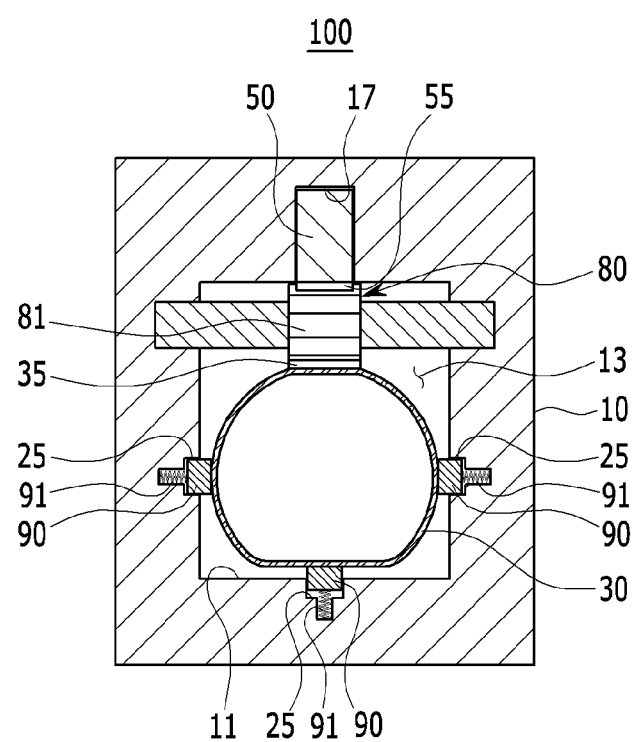
FIG. 3 is an exemplary side cross-sectional view showing the configuration of the device that attaches and dettaches a connector for an electric vehicle of a battery replacement type according to an exemplary embodiment of the present invention.

FIG. 2 is an exemplary front cross-sectional view showing the configuration of the device that attaches and dettaches a connector for an electric vehicle of a battery replacement type according to an exemplary embodiment of the present invention and FIG. 3 is an exemplary side cross-sectional view showing the configuration of the device that attaches and dettaches a connector for an electric vehicle of a battery replacement type according to an exemplary embodiment of the present invention.

Referring to FIGS. 1 to 3, the device 100 may include a connector housing 10, a connecting member 30, a movable member 50, an elastic member 70, a power transmitting member 80, and guide members 90.

The connector housing 10, which may electrically connect the high-voltage cable 7 at the vehicle with the connector 5 at the battery, may be equipped with various constituent elements that are described below. The connector housing 10 may include, for example, a hexahedral shape and may be connected to the battery movement path of the battery mounting module 3 as stated above. Further, the connector housing 10 may be disposed at the battery insertion end in the battery movement path of the battery mounting module 3.

The connecting member 30, a connector connected to the high-voltage cable 7 at the vehicle, may be movably disposed toward both sides within the connecting housing 10 and may be selectively brought in contact with the connector 5 at the battery 5. A guide aperture 11 through which the connecting member 30 may be drawn in/out may be formed within the connector housing 10. The guide aperture 11 may define a first movement path 13 through which the connecting member may move to both sides. The guide aperture 11 may be a movement passageway having a rectangular cross-section. The connecting member 30 may be a cylindrical female connector that may be combined with the connector 5 at the battery 5, for example, in the female and male type with a male connector, and may be movably disposed within the guide aperture 11 of the connector housing 10. The connecting member 30 may form planes longitudinally on the top and the bottom.

The movable member 50 may be movably disposed to both sides within the connector housing 10, corresponding to the connecting member 30. The movable member 50 may be disposed within the connector housing 10, movably in parallel with and over the connecting member 30, in the drawings. In this configuration, the movable member 50 may be moved to one side by a guide pin 9 of the connector 5 at the battery and may be moved to the other side by the elastic member 70, which is described in detail below.

In particular, a second movement path 15 through which the movable member 50 may move may be defined within the connector housing 10. A guide rail 17 with which the movable member 50 is slidably engaged may be formed in the second movement path 15. A stopper 19 that restricts the sliding of the movable member 50 may be formed at both ends of the guide rail 17. Further, an insertion bore 21 connected with the second movement path 15 and into which the guide pin 9 stated above may be inserted may be formed within the connector housing 10. Accordingly, when the battery 1 is mounted on the battery mounting module 3, the movable member 50 may be moved to one side along the guide rail 17 by the guide pin 9 inserted into the second movement path 15 through the insertion bore 21.

The elastic member 70, which applies an elastic force to the movable member 50 when the movable member 50 moves to one side along the guide rail 17, may be connected with the movable member 50 and the connector housing 10. The elastic member 70 may include a return spring 71 connected with the movable member 50 and the connector housing 10 in the second movement path 15 of the movable member 50. In addition, one end of the return spring 71 may be connected to the movable member 50 and the other end may be connected to the connector housing 10. Therefore, when the battery 1 is separated (e.g., drawn out) from the battery mounting module 3, the movable member 50 may be moved to the other side (initial position) by the elastic restoring force of the return spring 71.

The power transmitting member 80 that transmits the movement force (e.g., power) applied to the movable member 50, may move the connecting member 30 in the direction opposite to the movement direction of the movable member. In addition, the power transmitting member 80, which allows the connecting member 30 and the movable member 50 to be engaged, may include a pinion gear 81 rotatably disposed within the connector housing 10, between the connecting member 30 and the movable member 50. For example, the pinion gear 81 may be in mesh with a first rack gear 35 formed longitudinally on the top of the connecting member 30 and may be in mesh with a second rack gear 55 formed longitudinally on the bottom of the movable member 50.

Accordingly, when the battery 1 is mounted on the battery mounting module 3, as the movable member 50 is moved to one side by the guide pin 9, the pinion gear 81 may move the connecting member 30 to the other side while rotating in one direction. In particular, the connecting member 30 may be electrically connected to the connector 5 at the battery. Further, when the battery 1 is separated (e.g., drawn out) from the battery mounting module 3, as the movable member 50 is moved to the other side by the elastic restoring force of the return spring 71, the pinion gear 81 may move the connecting member 30 to the one side while rotating in the other direction. Therefore, the connecting member 30 may be separated from the connector 5 at the battery.

On the other hand, the guide members 90, that guide the connecting member 90, may align the connecting member 30 into position with respect to the guide groove 11 of the connector housing 10 to connect the connector 5 at the battery more accurately to the connecting member 30 and to compensate for the connection error of the connecting member 30 to the connector 5 at the battery. In other words, resistance may be generated in the connection of the connector 5 and the connecting member 30 due to a manufacturing error of the connector 5 at the battery and the connecting member 30, and thus the guide members 90 connect the connector 5 at the battery and the connecting member 30 while controlling the position of the connecting member 30 both horizontally and vertically.

The guide members 90 may be disposed on the inner side of the guide aperture 11 in the first movement path 13 of the connector housing 10. In particular, the guide members 90 may be seated in mounting grooves 25 on the inner side of the guide aperture 11. For example, the guide members 90 may be partially or fully seated in the mounting grooves 25 by a shock-absorbing spring 91, such as roller bearings having a circular cross-section.

The operation of the device 100 that attaches and dettaches a connector for an electric vehicle of a battery replacement type according to an exemplary embodiment of the present invention which has the configuration described above is described hereafter in detail with reference to the drawings stated above and the others.

Figure 4:
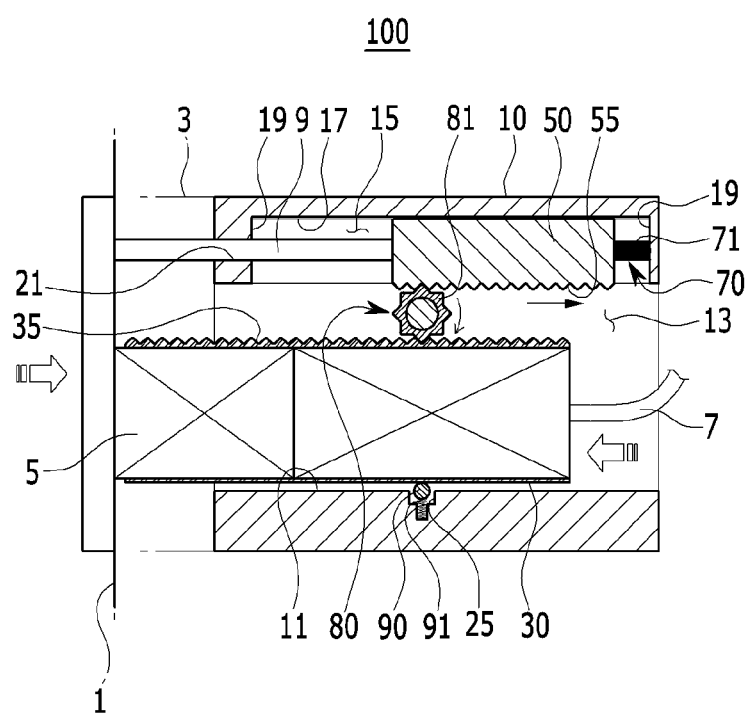
FIGS. 4 and 5 are exemplary views illustrating the operation of the device that attaches and dettaches a connector for an electric vehicle of a battery replacement type according to an exemplary embodiment of the present invention.
Figure 5:
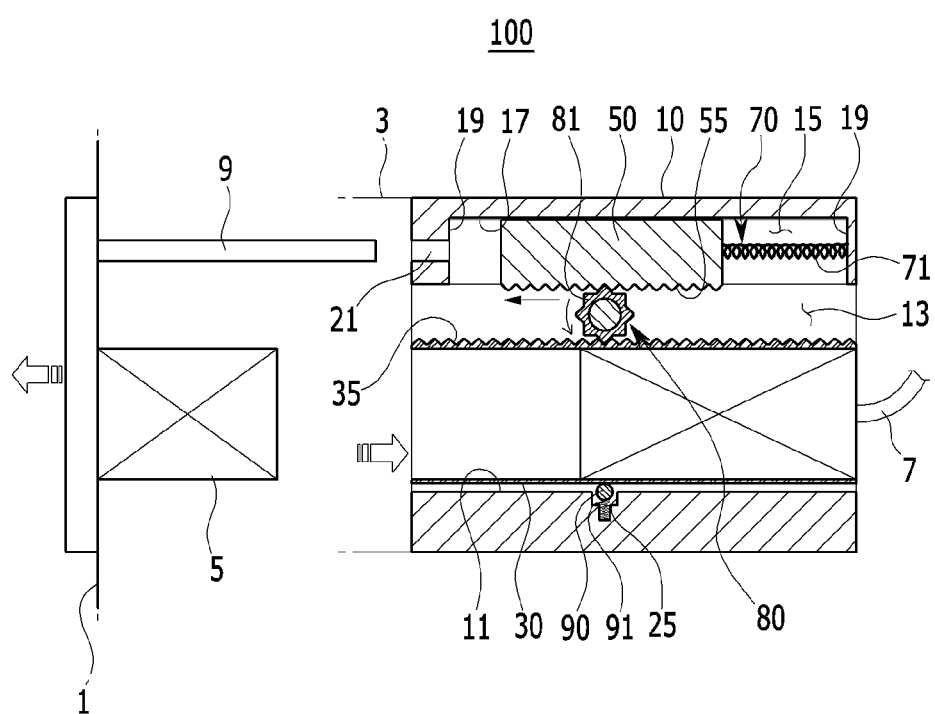

FIGS. 4 and 5 are exemplary views illustrating the operation of the device that attaches and dettaches a connector for an electric vehicle of a battery replacement type according to an exemplary embodiment of the present invention. Hereinafter, it is described first that a fully charged battery 1 that has been sufficiently charged is mounted on the battery mounting module 3, with the battery 1 separated from the battery mounting module 3, with reference to FIG. 4.

First, in an exemplary embodiment of the present invention, the battery 1 may be pushed into the battery mounting module 3 by a battery replacement jig (not shown). In this process, the guide pin 9 of the connector 5 at the battery may be inserted into the second movement path 15 through the insertion bore 21 of the connector housing 10 and may move the movable member 50 to one side. The movable member 50 may move to one side along the second guide rail 15 against the elastic force of the return spring 71 while being guided on the guide rail 17.

When the movable member 50 is moved to one side by the guide pin 9, as described above, the pinion gear 81 of the power transmitting member 80 may move the connecting member 30 to the other side, that is, toward the connector 5 at the battery while rotating in one direction. Accordingly, the connecting member 30 may move to the other side along the guide aperture 11 of the connector housing 10 and may be fitted onto the connector 5 at the battery. In this process, the guide members 90 of the connector housing 10 may compensate for the connection error of the connecting member 30 to the connector 5 at the battery while controlling the position of the connecting member 30 up/down and left/right. In other words, when resistance is generated in the connection of the connector 5 and the connecting member 30 due to a manufacturing error of the connector 5 at the battery and the connecting member 30, the guide members 90 may smoothly connect the connector 5 at the battery and the connecting member 30 together while controlling the position of the connecting member 30 both horizontally and vertically.

Therefore, in an exemplary embodiment of the present invention, when the battery 1 is mounted on the battery mounting module 3, the connector 5 at the battery may be electrically connected to the connecting member 30 at the high-voltage cable 7 through the process describe above.

Hereinafter, it is described with reference to FIG. 5 that the battery 1 that has been discharged is separated from the battery mounting module 3. First, in an exemplary embodiment of the present invention, the battery 1 may be pulled out of the battery mounting module 3 by a battery replacement jig (not shown). In this process, the guide pin 9 of the connector 5 at the battery may be pulled out of the second movement path 15 through the insertion bore 21 of the connector housing 10 and the movable member 50 may be moved to the other side (e.g., an initial position) by the elastic restoring force of the return spring 71. Further, as the movable member 50 is moved to the other side by the elastic restoring force of the return spring 71, the pinion gear 81 of the power transmitting member 80 may move the connecting member 30 to one side, that is, away from the connector 5 at the battery while rotating in the other direction. Therefore, the connecting member 30 may move to one side along the guide aperture 11 of the connector housing 10 and may be naturally separated from the connector 5 at the battery.

As described above, according to the device 100 that attaches and dettaches a connector for an electric vehicle of a battery replacement type according to an exemplary embodiment of the present invention, it may be possible to automatically connect and separate the connector 5 at the battery and the high-voltage cable 7 at the vehicle, when replacing the battery 1 in the battery mounting module 3. Therefore, in an exemplary embodiment of the present invention, it may be more convenient to replace the battery 1 and reduce the time for replacing a battery as well as reducing a safety risk during the manual replacement of a battery.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

| Description of symbols | |
| --- | --- |
| 1: battery | 3: battery mounting module |
| 5: connector at battery | 7: high-voltage cable |
| 9: guide pin | 10: connector housing |
| 11: guide aperture | 13: first movement path |
| 15: the second movement path | 17: guide rail |
| 19: stopper | 21: insertion bore |
| 25: mounding groove | 30: connecting member |
| 35: first rack gear | 50: movable member |
| 55: second rack gear | 70: elastic member |
| 71: return spring | 80: power transmitting member |
| 81: pinion gear | 90: guide member |
| 91: shock-absorbing spring | |

What is claimed is:

1. A device that attaches and detaches a connector for an electric vehicle of a battery replace type, the device comprising:
    a connector housing disposed on a battery mounting module that mounts and separates a battery of an electric vehicle;
    a connecting member connected to a cable at the vehicle, movably disposed within the connector housing, and selectively connected with the connector at the battery;
    a movable member movably disposed within the connector housing in correspondence to the connecting member; and
    a power transmitting member that is connected to the connecting member and the movable member and moves the connecting member opposite to the movement direction of the movable member,
    wherein the connecting member is configured to move opposite to the movement direction of the movable member and
    wherein the movable member is configured to be moved by pushing of a guide pin that is mounted on the connector at the battery.

2. The device of claim 1, wherein a first movement path through which the connecting member moves and a second movement path through which the movable member moves are formed within the connector housing.

3. The device of claim 2, wherein the guide pin is inserted into the second movement path.

4. The device of claim 1, further comprising:
an elastic member that is connected with the movable member and the connector housing and applies an elastic force to the movable member.

5. The device of claim 4, wherein the elastic member includes:
a return spring that connects the movable member and the connector housing together in the movement path of the movable member.

6. The device of claim 1, further comprising:
a plurality of guide members disposed within the movement path of the connecting member in the connector housing and guides the connecting member.

7. The device of claim 6, wherein the guide members are seated in mounting grooves on the inner side of the movement path of the connecting member and are seated in the mounting grooves by a shock-absorbing spring.

8. The device of claim 1, wherein the power transmitting member includes a pinion gear rotatably disposed within the connector housing.

9. The device of claim 8, wherein a first rack gear that engages with the pinion gear is formed on the connecting member.

10. The device of claim 9, wherein a second rack gear that engages with the pinion gear is formed on the movable member.

11. The device of claim 1, wherein as a battery is mounted on the battery mounting module, the movable member is moved to one side by the guide pin, and the connecting member is moved to the other side by the power transmitting member and electrically connected with the connector at the battery.

12. The device of claim 1, wherein as a battery is drawn out from the battery mounting module, the movable member is moved to the other side by the elastic force of a spring, and the connecting member is moved to one side by the power transmitting member and separated from the connector at the battery.

13. A device that attaches and detaches a connector for an electric vehicle of a battery replacement type, the device comprising:
a connector housing disposed on a battery mounting module;
a connecting member connected to a cable at the vehicle, movably disposed within the connector housing, and selectively connected with the connector at the battery;
a movable member movably disposed within the connector housing in correspondence to the connecting member;
a pinion gear that is rotatably disposed within the connector housing, between the connecting member and the movable member, and engages with rack gears on the connecting member and the movable member;
an elastic member that is connected with the movable member and the connector housing and applies an elastic force to the movable member; and
a plurality of guide members that is disposed within the movement path of the connecting member within the connector housing and guides the connecting member,
wherein the connecting member is configured to move opposite to the movement direction of the movable member and
wherein the movable member is configured to be moved by pushing of a guide pin that is mounted on the connector at the battery.

14. The device of claim 13, wherein the connector housing is connected to a battery movement path of the battery mounting module.

15. The device of claim 13, wherein a guide aperture that is a movement path through which the connecting member is drawn in and out is formed within the connector housing.

16. The device of claim 13, wherein
a guide rail that the movable member slidably engages with is disposed within the connector housing, and
a stopper is formed at both ends of the guide rail.

17. The device of claim 13, wherein an insertion bore that is connected with the movement path of the movable member and into which the guide pin is inserted is formed within the connector housing.

* * * * *